United States Patent [19]

Gothelf

[11] Patent Number: 5,475,272
[45] Date of Patent: Dec. 12, 1995

[54] POWER CAPACITOR

[75] Inventor: Natan Gothelf, Huddinge, Sweden

[73] Assignee: Asea Brown Boveri AB, Vasteras, Sweden

[21] Appl. No.: 129,128

[22] PCT Filed: Feb. 28, 1992

[86] PCT No.: PCT/SE92/00122

§ 371 Date: Oct. 8, 1993

§ 102(e) Date: Oct. 8, 1993

[87] PCT Pub. No.: WO92/20082

PCT Pub. Date: Nov. 12, 1992

[30] Foreign Application Priority Data

Apr. 24, 1991 [SE] Sweden ................................. 9101232

[51] Int. Cl.⁶ ..................................................... H01G 4/38
[52] U.S. Cl. ........................ 307/109; 361/275.3; 361/329; 361/16
[58] Field of Search ....................... 307/109; 361/15–17, 361/301.5, 323, 324, 328, 329, 272, 275.3

[56] References Cited

U.S. PATENT DOCUMENTS

| | | | |
|---|---|---|---|
| 1,991,707 | 10/1931 | Silbermann | 361/329 |
| 2,294,099 | 10/1938 | Trapp | 361/17 |
| 4,459,637 | 7/1984 | Shedigian | 361/323 |
| 4,771,362 | 9/1988 | Behn | 361/323 |
| 4,891,733 | 1/1990 | Mammone | 361/323 |
| 5,305,178 | 4/1994 | Binder et al. | 361/323 |

Primary Examiner—William M. Shoop, Jr.
Assistant Examiner—Richard T. Elms
Attorney, Agent, or Firm—Watson, Cole, Grindle & Watson

[57] ABSTRACT

A power capacitor (30, 40) composed of a plurality of parallel-connected strings (36) of capacitor elements (33, 43), wherein each string comprises a plurality of series-connected capacitor elements, said parallel strings are interconnected at their end points only and said capacitor elements (33,43) are adapted such that, in case of a breakdown, the electrodes are welded together to achieve a solid short circuit of the faulty capacitor element. (FIG. 3)

6 Claims, 1 Drawing Sheet

POWER CAPACITOR

TECHNICAL FIELD

The invention relates to a power capacitor with energy limiting properties without fuses and wherein the design and function combine technical advantages of capacitors with internal fuses with the simplicity of capacitors with external fuses.

BACKGROUND ART

Modern power capacitors are characterized by very great energy density, which makes it important to limit the consequences of a fault. As primary protection against capacitor explosions, fuses are used in conventional power capacitors. There are two accepted methods of providing power capacitors with fuses:

a) by means of internal fuses, and
b) by means of external fuses.

Protection of power capacitors by means of internal fuses is space-demanding and renders production expensive since each capacitor element is series-connected with a fuse. However, in relation to the constructionally simpler protection using external fuses, protection by means of internal fuses entails technical advantages since a fault leads to disconnection of the faulty element, which results in very small capacitance changes and increased availability of a power capacitor with internal fuses.

Currently used power capacitors have inherent limitations which can be derived from the respective fuse technique:

Power capacitor units with internal fuses require a certain number of parallel-connected capacitor elements in each group, which limits the maximum unit voltage to approximately 9 kV. High-voltage capacitor banks must therefore be composed of a large number of series-connected groups.

Power capacitors with external fuses have poor protective function at currents higher than 30 A, which limits the maximum unit current. In addition, a certain number of parallel-connected capacitor units in each group are required. Power capacitors protected by means of external fuses must therefore be connected in few series-connected groups with a relatively large number of parallel-connected capacitor units in each group.

Fuse-free power capacitor designed according to the invention eliminate the above-mentioned limitations, and thus, while utilizing the invention, power capacitors can be designed in the most economical way in all applications.

SUMMARY OF THE INVENTION

A power capacitor, which by its design and function combines the technical advantages of power capacitors with an internal fuse with the simplicity and compactness of power capacitors with an external fuse, are achieved by arranging, according to the present invention, a power capacitor comprising a plurality of series-parallel connected capacitor elements, wherein a) the power capacitor is composed of a plurality of parallel-connected strings of capacitor elements,
b) each string comprises a plurality of series-connected capacitor elements,
c) the parallel strings are interconnected only at their end points, and wherein dielectrics and electrodes included in the capacitor element are arranged such that the electrodes are welded together in case of breakdown and a solid short circuit without the risk of partial discharge or restriking occurs.

Capacitor elements are preferably used in the form of so-called wound foil capacitors of full-film type, the would foil being composed of several wound turns of metal foils serving as electrodes and a solid dielectric arranged between the turns, in the form of one or more polymer films. In case of a controlled breakdown, the metal foils are welded together and thus achieve a solid short circuit. Such an element may remain in operation without the risk of restriking or partial discharge at the fault. A similar fault in a capacitor element with mixed or paper dielectric causes partial discharge and development of gas which in the long run, if the fault point is not disconnected by means of fuses, may blast away the casing surrounding the power capacitor. However, also a breakdown in a wound foil capacitor of full-film type included in a conventionally designed power capacitor would lead to partial discharge as a result of damage caused by the heavy energy development at the fault point of a conventionally designed power capacitor. This is avoided by designing the power capacitor according to the invention such that the energy development upon a breakdown is limited.

In case of breakdown of a capacitor element, this is short-circuited and the unit capacitance is insignificantly increased. The change in capacity in case of a breakdown is of the same order of magnitude as when an internal fuse disconnects a faulty capacitor element in a capacitor with internal fuses. An advantage with the design according to the invention in relation to a power capacitor with internal fuses is that the energy development is considerably lower, which results in a minimal risk of damage to adjacent elements or an external insulation. In addition, a power capacitor according to the invention is considerably simpler to install and connect during production than a power capacitor with internal fuses. An additional advantage in relation to power capacitors with internal fuses is that power capacitors built up according to the invention are considerably more compact.

Preferably, a power capacitor according to the invention is composed of at least three parallel-connected strings of capacitor elements, each string comprising at least three capacitor elements.

In an embodiment with capacitor elements in the form of wound foil capacitors of full-film type, where the wound foil is composed of several wound turns of metal foils serving as electrodes and a solid dielectric arranged between the turns, in the form of polymer film, the wound foil capacitors are stacked one above the other and connected in series. Two busbars are arranged along the whole stack. To these busbars, the strings of series-connected capacitor elements are connected. Since the strings are connected alternately to each busbar, the polarity between adjacent strings is changed and great potential differences along the capacitor stack are avoided. The maximum voltage between two adjacent wound foil capacitors corresponds to two element voltages. By this design, which is simplified in relation to known technique, very compact power capacitors with energy-limiting properties can be designed without fuses. These power capacitors combine the technical advantages of internal fuses with the simplicity of power capacitors with external fuses. The energy-limiting design also ensures that, on the occurrence of a fault, a controlled breakdown, that is, a breakdown with limited and controlled energy development, arises and the metal foils are welded together and bring about a solid short circuit without partial discharge or gas development occurring. In addition, this energy-limiting design permits the capacitor unit with the faulty capacitor element to remain in operation without the risk of restriking or partial discharge at the fault point.

In the foregoing the invention has substantially been exemplified by power capacitors comprising capacitor elements in the form of wound foil capacitors of full-film type but is, of course, applicable to other types of capacitor elements in which a controlled breakdown leads to a solid short circuit such that the capacitor unit with the faulty capacitor element may remain in operation without the risk of restriking or partial discharge at the fault point.

BRIEF DESCRIPTION OF THE DRAWING

The invention will be described in more detail in the following with reference to the accompanying FIGS. 1–3.

DESCRIPTION OF THE PREFERRED EMBODIMENTS

Figure 1:
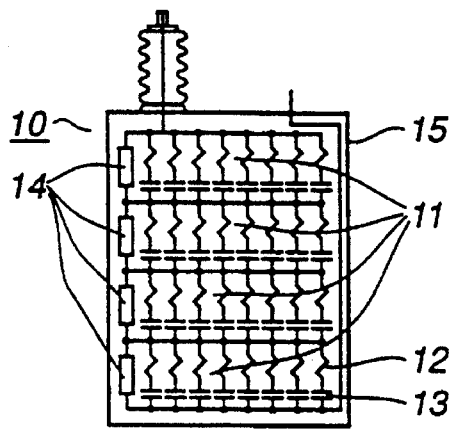
FIGS. 1 and 2 show power capacitors according to the prior art with internal and external fuses, respectively.

The power capacitor 10 shown in FIG. 1 is protected by means of internal fuses 12. The power capacitor is composed of a plurality of series-connected groups 11. Each group 11 comprises a plurality of parallel-connected capacitor elements 13, each element being connected in series with its own fuse 12. For discharge of the power capacitor, a discharge resistor 14 is arranged for each group 11 of parallel-connected capacitor elements 13 and is connected in parallel with the group 11. The power capacitor 10 is surrounded by a casing 15. A power capacitor according to the FIG. 1 equipped with internal fuses is complicated and expensive since it comprises a large number of capacitor elements 13 and fuses 12.

Figure 2:
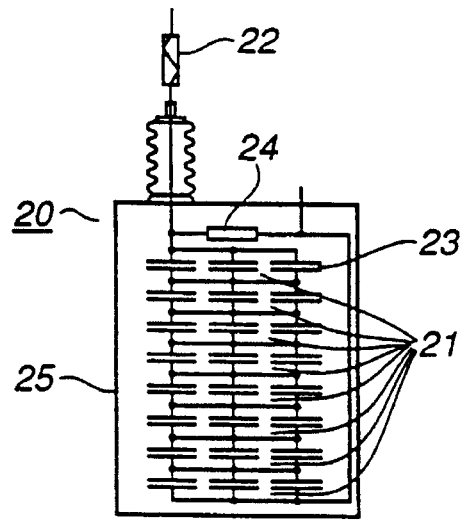

A power capacitor protected by means of an external fuse is shown in FIG. 2. A plurality of groups 21 of parallel-connected capacitor elements 23 are arranged in series connection. Contrary to the power capacitor of FIG. 1, there are no fuses directly connected to the capacitor elements 23 but the power capacitor 20 is protected by means of an external fuse 22 arranged outside the power capacitor 20. For discharge of the power capacitor 20, a discharge resistor 24 is arranged. The discharge resistor 24 is connected in parallel with the chain of series-connected groups 21 of parallel-connected capacitor elements 23. However, this means that in case of a fault on an element, a high discharge energy arises at the fault point, which entails a risk of blasting of the casing 25 surrounding the power capacitor 20. In addition, great capacitance variations arise before and after the fuse function.

Figure 3:
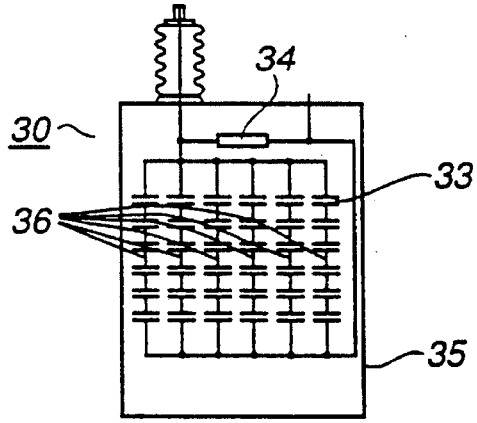
FIG. 3 shows a power capacitor without fuses according to the invention.

FIG. 3 shows a power capacitor without fuses according to the invention. The power capacitor 30 is composed of a plurality of parallel-connected strings 36 of series-connected capacitor elements 33, the parallel strings 36 being interconnected at their end points only. For discharge of the power capacitor 30, a discharge resistor 34 is arranged. The discharge resistor 34 is connected in parallel with the strings 36 of series-connected capacitor elements 33. The power capacitor has no fuses, which means that in case of breakdown of a capacitor element 33, the element 33 is short-circuited and the unit capacitance is insignificantly increased. The change of capacitance is of the same order of magnitude as when an internal fuse disconnects a faulty capacitor element in a capacitor unit with internal fuses. Like the power capacitors in FIGS. 1 and 2, the power capacitor 30 is shown enclosed within a casing 35. An advantage of the design according to the invention in relation to a power capacitor with internal fuses is that the energy development is considerably lower, which minimizes the risk of damage to adjoining capacitor elements or external insulation. In addition, a power capacitor according to the invention is considerably easier to install and connect during production than a power capacitor with internal fuses. An additional advantage in relation to power capacitors with internal fuses is that power capacitors designed according to the invention will be considerably more compact.

Figure 4:
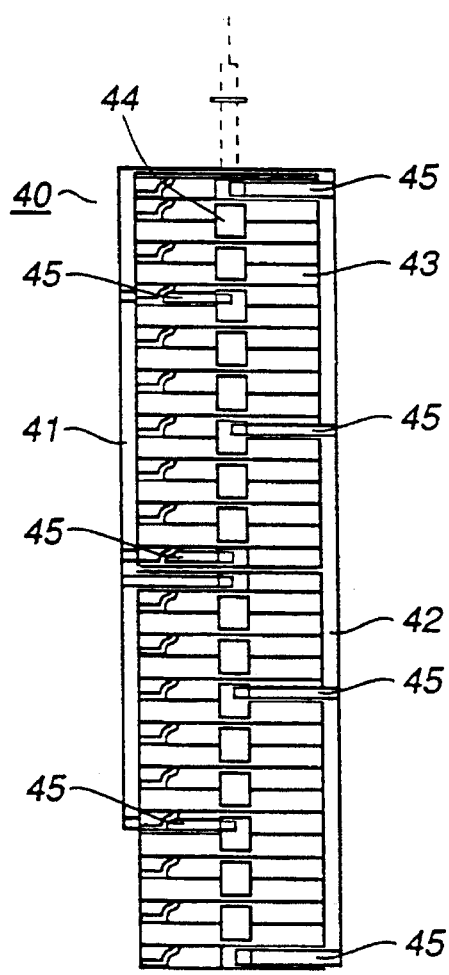
FIG. 4 shows a preferred embodiment with the capacitor elements in the form of so-called wound foil capacitors.

In a preferred embodiment, shown in FIG. 4, with capacitor elements in the form of so-called wound foil capacitors 43, where the wound foil 43 is built up of a plurality of wound turns of metal foils serving as electrodes and a solid dielectric arranged between the turns, in the form of polymer film, the wound foil capacitors 43 are arranged stacked on top of each other and connected in series by means of connection devices 44. Two busbars 41, 42 are arranged along the entire stack 40, one busbar on each side. To these busbars 41, 42 there are connected the strings of series-connected wound foil capacitors 43 by means of the connections 45. The strings are connected alternately to the busbars 41, 42 which are each arranged on one side, the polarity thus changing between adjoining strings such that great potential differences along the capacitor stack 40 are avoided. The maximum voltage between two adjoining wound foil capacitors 43 corresponds to two element voltages. By this design, which is simplified in relation to the prior art, very compact, fuse-free power capacitors with energy limiting properties may be designed, which combine the technical advantages of power capacitors with internal fuses with the simplicity of power capacitors with external fuses. The energy limiting design also ensures that, on the occurrence of a fault, a controlled breakdown, that is, a breakdown with a limited and controlled energy development, arises, the metal foils included in the wound foil capacitors 43 thus being welded together and achieving a solid short circuit without partial discharge or gas development arising. In addition, this energy limiting design permits the faulty capacitor element to remain in operation without the risk of restriking or partial discharge at the fault point.

I claim:

1. A power capacitor, comprising:

a plurality of parallel-connected strings of capacitor elements, each string comprising a plurality of series-connected capacitor elements, each said capacitor elements having a pair of electrodes, and each said string including first and second end points, the respective first and second end points of each said string being respectively interconnected to form the plurality of parallel-connected strings; and said capacitor elements each having the property that, upon an electrical breakdown of a capacitor element, the pair of electrodes of the capacitor element are welded together to form a short circuit of the faulty capacitor element.

2. A power capacitor according to claim 1, wherein the power capacitor includes at least three of said parallel-connected strings and each said string includes at least three series-connected capacitor elements.

3. A power capacitor according to claim 1, wherein said capacitor elements are wound foil capacitors including wound turns of metal foils forming the electrodes and with a solid dielectric polymer film between the wound turns, said wound foil capacitors being stacked on top of one another, said power capacitor further comprising connection devices, connection elements and a pair of spaced busbars, said wound foil capacitors being connected in series by said connection devices, the stack of series-connected wound foil capacitors are connected between the spaced pair of busbars by said connection elements.

4. A power capacitor according to claim 2, wherein said capacitor elements are wound foil capacitors including wound turns of metal foils forming the electrodes and with a solid dielectric polymer film between the wound turns, said wound foil capacitors being stacked on top of one another, said power capacitor further comprising connection devices, connection elements and a spaced pair of busbars, said wound foil capacitors being connected in series by said connection devices, the stack of series-connected wound foil capacitors are connected between the pair of spaced busbars by said connection elements.

5. A power capacitor according to claim 4, wherein the strings of series-connected wound foil capacitors are alternately connected to the pair of spaced busbars to change the polarity between adjacent strings of series-connected wound foil capacitors, thereby limiting the voltage potential difference along the capacitor stack.

6. A power capacitor according to claim 3, wherein the strings of series-connected wound foil capacitors are alternately connected to the pair of spaced busbars to change the polarity between adjacent strings of series-connected wound foil capacitors, thereby limiting the voltage potential difference along the capacitor stack.

* * * * *